(12) United States Patent
Tan

(10) Patent No.: US 9,742,548 B2
(45) Date of Patent: Aug. 22, 2017

(54) METHOD AND APPARATUS FOR USING SERIAL PORT IN TIME DIVISION MULTIPLEXING MANNER

(71) Applicant: Huawei Technologies Co., Ltd., Shenzhen (CN)

(72) Inventor: Lijuan Tan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 58 days.

(21) Appl. No.: 14/709,052

(22) Filed: May 11, 2015

(65) Prior Publication Data

US 2015/0333897 A1 Nov. 19, 2015

(30) Foreign Application Priority Data

May 15, 2014 (CN) .......................... 2014 1 0205755

(51) Int. Cl.
*H04L 5/22* (2006.01)
*H04L 12/935* (2013.01)
*G06F 13/26* (2006.01)
*G06F 13/42* (2006.01)

(52) U.S. Cl.
CPC ............... *H04L 5/22* (2013.01); *G06F 13/26* (2013.01); *G06F 13/4282* (2013.01); *H04L 49/30* (2013.01)

(58) Field of Classification Search
CPC ............ H04L 5/22; H04L 49/30; G06F 13/00
See application file for complete search history.

(56) References Cited

U.S. PATENT DOCUMENTS

| | | | | |
|---|---|---|---|---|
| 5,299,190 A | * | 3/1994 | LaMaire | H04L 12/5601 370/413 |
| 5,388,217 A | * | 2/1995 | Benzschawel | G06F 13/122 710/36 |
| 5,428,806 A | * | 6/1995 | Pocrass | G06F 13/409 710/100 |
| 5,483,528 A | * | 1/1996 | Christensen | H04M 9/08 370/263 |

(Continued)

FOREIGN PATENT DOCUMENTS

| | | |
|---|---|---|
| CN | 101500331 A | 8/2009 |
| CN | 202150110 U | 2/2012 |

(Continued)

*Primary Examiner* — Alex Skripnikov
(74) *Attorney, Agent, or Firm* — Leydig, Voit & Mayer, Ltd.

(57) ABSTRACT

A method and an apparatus for using a serial port device in a time division multiplexing manner are provided. The apparatus includes a first serial port, a second serial port, a switching circuit, and a signal interface, where the switching circuit selects to receive data sent; the first serial port sends first data to a first serial port device; the second serial port receives second data sent by a second serial port device, and when it is determined that the second data indicates that the second serial port device needs to receive third data sent by the second serial port, instructs the switching circuit to select to receive the third data sent; and the second serial port sends the third data to the second serial port device. Therefore, the first serial port and the second serial port can use corresponding serial port devices in a time division multiplexing manner.

11 Claims, 3 Drawing Sheets

(56) References Cited

U.S. PATENT DOCUMENTS

| | | | | |
|---|---|---|---|---|
| 5,517,495 | A * | 5/1996 | Lund | H04L 12/5601 370/399 |
| 5,596,578 | A * | 1/1997 | Cunningham | H04L 12/18 370/364 |
| 5,796,733 | A * | 8/1998 | Norris | H04Q 11/04 370/366 |
| 5,826,068 | A | 10/1998 | Gates | |
| 5,831,848 | A * | 11/1998 | Rielly | G05B 19/0421 370/402 |
| 5,953,509 | A * | 9/1999 | Ciccarelli | H04M 3/493 710/100 |
| 6,105,060 | A * | 8/2000 | Rothblatt | H04B 7/18584 709/219 |
| 6,184,847 | B1 * | 2/2001 | Fateh | G06F 3/011 345/8 |
| 6,188,686 | B1 * | 2/2001 | Smith | H04L 12/5601 370/388 |
| 6,266,341 | B1 * | 7/2001 | Surprenant | H04L 12/2856 370/353 |
| 6,317,804 | B1 * | 11/2001 | Levy | G06F 13/4022 710/305 |
| 6,445,364 | B2 * | 9/2002 | Zwern | 345/156 |
| 6,470,404 | B1 | 10/2002 | Kim | |
| 6,801,518 | B2 * | 10/2004 | Mullaney | H04J 3/0685 370/343 |
| 6,912,217 | B1 * | 6/2005 | Vogel | H04J 3/1617 370/389 |
| 7,047,350 | B2 * | 5/2006 | Elledge | G06F 13/4027 370/357 |
| 7,535,893 | B1 * | 5/2009 | Beladakere | H04L 12/5601 370/353 |
| 2001/0044843 | A1 * | 11/2001 | Bates | G06F 9/4446 709/224 |
| 2002/0021710 | A1 * | 2/2002 | Bold | H04M 3/22 370/442 |
| 2002/0054588 | A1 * | 5/2002 | Mehta | H04L 43/028 370/352 |
| 2002/0075879 | A1 * | 6/2002 | Ramey | H04M 7/006 370/401 |
| 2004/0213255 | A1 * | 10/2004 | Brinkerhoff | H04L 12/5693 370/395.1 |
| 2005/0080975 | A1 * | 4/2005 | Elledge | G06F 13/4027 710/316 |
| 2009/0168797 | A1 * | 7/2009 | Danielson | H04J 3/1682 370/458 |
| 2011/0320657 | A1 | 12/2011 | Drapala et al. | |

FOREIGN PATENT DOCUMENTS

| | | |
|---|---|---|
| CN | 202372976 U | 8/2012 |
| CN | 102930064 A | 2/2013 |
| DE | 102010061734 A1 | 5/2012 |
| JP | S59163624 A | 9/1984 |
| JP | 2012226457 A | 11/2012 |
| JP | 2014035709 A | 2/2014 |
| WO | WO 2012076257 A1 | 6/2012 |

* cited by examiner

METHOD AND APPARATUS FOR USING SERIAL PORT IN TIME DIVISION MULTIPLEXING MANNER

CROSS-REFERENCE TO RELATED APPLICATION

This application claims priority to Chinese Patent Application No. 201410205755.5, filed on May 15, 2014, which is hereby incorporated by reference in its entirety.

TECHNICAL FIELD

The present invention relates to communications technologies, and in particular, to a method and an apparatus for using a serial port in a time division multiplexing manner.

BACKGROUND

Currently, serial communication is an extremely important and commonly used communication mode between embedded systems, such as a single-chip microcomputer and a digital signal processor (DSP), and between an embedded system and a personal computer (PC) or a wireless module.

FIG. 1 shows an architecture in which multiple serial ports in a chip in the prior art communicate with multiple serial port devices outside the chip by using a signal interface, where the signal interface is an interface for a serial port inside the chip to communicate with a serial port device that is outside the chip and corresponding to the serial port. The signal interface includes a Tx interface and an Rx interface, where the Tx is a signal transmitting interface, and the Rx is a signal receiving interface. Each serial port inside the chip sends data to a corresponding serial port device by using the Tx interface of the signal interface, and each serial port inside the chip receives, by using the Rx interface of the signal interface, data sent by the corresponding serial port device, so as to implement communication between each serial port and the corresponding serial port device, for example, communication between a serial port 1 and a serial port device 1, and communication between a serial port 2 and a serial port device 2.

In consideration of factors such as costs and power consumption, only one signal interface is designed during chip design. Therefore, in a case in which a quantity of signal interfaces of a chip cannot be increased, multiple serial ports inside the chip communicate with respectively corresponding serial port devices by using the only one signal interface, which causes a communication conflict.

SUMMARY

Embodiments of the present invention provide a method and an apparatus for using a serial port device in a time division multiplexing manner, so that multiple serial ports can use corresponding serial port devices in a time division multiplexing manner, thereby ensuring that there is no communication conflict in an entire communication process.

To achieve the foregoing objective, the following technical solutions are used in the embodiments of the present invention:

According to a first aspect, an apparatus for using a serial port device in a time division multiplexing manner is provided, and the apparatus includes a first serial port, a second serial port, a switching circuit, and a signal interface, where:

the switching circuit is configured to select to receive data sent by one serial port from the first serial port and the second serial port, and output the data to the signal interface;

the signal interface is coupled to a first serial port device and a second serial port device outside the apparatus;

the first serial port is coupled to the signal interface by using the switching circuit and configured to, when the switching circuit selects to receive first data sent by the first serial port, send the first data to the first serial port device corresponding to the first serial port by using the switching circuit and the signal interface;

the first serial port is further configured to receive fourth data sent by the first serial port device by using the signal interface;

the second serial port is configured to receive, by using the signal interface, second data sent by the second serial port device corresponding to the second serial port, and determine whether the second data indicates that the second serial port device needs to receive third data sent by the second serial port; and if the second data received by the second serial port indicates that the second serial port device needs to receive the third data sent by the second serial port, instruct the switching circuit to select to receive the third data sent by the second serial port; and the second serial port is coupled to the signal interface by using the switching circuit and further configured to, when the switching circuit selects to receive the third data sent by the second serial port, send the third data to the second serial port device by using the switching circuit and the signal interface.

With reference to the first aspect, in a first possible implementation manner, the apparatus further includes a message notification module, and the second serial port is specifically configured to:

when the second data received by the second serial port indicates that the second serial port device needs to receive the third data sent by the second serial port, send, to the message notification module, an indication that the second serial port device needs to receive the third data sent by the second serial port; and after receiving the indication, sent by the second serial port, that the second serial port device needs to receive the third data sent by the second serial port, the message notification module is configured to determine, according to a priority of the first serial port and a priority of the second serial port, whether to immediately instruct the switching circuit to select to receive the third data sent by the second serial port; and the message notification module is specifically configured to, when the priority of the second serial port is higher than the priority of the first serial port, immediately instruct the switching circuit to select to receive the third data sent by the second serial port; or when the priority of the second serial port is lower than the priority of the first serial port, wait to receive an indication, sent by the first serial port, that the first serial port completes sending the first data to the first serial port device, and after receiving the indication, sent by the first serial port, that the first serial port completes sending the first data to the first serial port device, instruct the switching circuit to select to receive the third data sent by the second serial port.

With reference to the first possible implementation manner of the first aspect, in a second possible implementation manner, the second serial port is further configured to send, to the message notification module, an indication that the second serial port completes sending the third data to the second serial port device; and the message notification module is further configured to, after receiving the indication, sent by the second serial port, that the second serial port completes sending the third data to the second serial port device, instruct the switching circuit to select to receive the first data sent by the first serial port, so as to restore the first serial port to send the first data to the first serial port device.

With reference to the first aspect, or the first or the second possible implementation manner of the first aspect, in a third possible implementation manner, the signal interface includes a signal transmitting interface and a signal receiving interface, where:

the first serial port and the second serial port are specifically coupled to the signal transmitting interface of the signal interface by using the switching circuit, the first serial port sends the first data to the signal transmitting interface by using the switching circuit, the second serial port sends the third data to the signal transmitting interface by using the switching circuit, and the signal transmitting interface sends the received first data to the first serial port device or sends the received third data to the second serial port device; and the signal receiving interface of the signal interface receives the fourth data sent by the first serial port device or the second data sent by the second serial port device, and sends the fourth data to the first serial port or the second data to the second serial port.

With reference to the first aspect, or the first, the second, or the third possible implementation manner of the first aspect, in a fourth possible implementation manner, the apparatus further includes a third serial port, the switching circuit is specifically configured to select to receive data sent by one serial port from the first serial port, the second serial port, and the third serial port, and output the data to the signal interface, and the third serial port is configured to:

receive, by using the signal interface, fifth data sent by a third serial port device that is outside the apparatus and corresponding to the third serial port, and determine whether the fifth data received by the third serial port indicates that the third serial port device needs to receive sixth data sent by the third serial port;

if the fifth data received by the third serial port indicates that the third serial port device needs to receive the sixth data sent by the third serial port, instruct the switching circuit to select to receive the sixth data sent by the third serial port; and when the switching circuit selects to receive the sixth data sent by the third serial port, send the sixth data to the third serial port device by using the switching circuit and the signal interface.

With reference to the first aspect, or the first, the second, the third, or the fourth possible implementation manner of the first aspect, in a fifth possible implementation manner, the apparatus is a chip.

According to a second aspect, a method for using a serial port device in a time division multiplexing manner is provided, where the method is applied to an apparatus for using a serial port device in a time division multiplexing manner, the apparatus includes a first serial port, a second serial port, a switching circuit, and a signal interface, the switching circuit is configured to select to receive data sent by one serial port from the first serial port and the second serial port and output the data to the signal interface, and the method includes:

sending, by the first serial port by using the switching circuit and the signal interface, first data to a first serial port device that is outside the apparatus and corresponding to the first serial port;

receiving, by the second serial port by using the signal interface, second data sent by a second serial port device that is outside the apparatus and corresponding to the second serial port, and determining whether the second data indicates that the second serial port device needs to receive third data sent by the second serial port;

if the second data received by the second serial port indicates that the second serial port device needs to receive the third data sent by the second serial port, instructing the switching circuit by the second serial port to select to receive the third data sent by the second serial port; and sending, by the second serial port by using the switching circuit and the signal interface, the third data to the second serial port device.

With reference to the second aspect, in a first possible implementation manner, the signal interface includes a signal transmitting interface and a signal receiving interface, and the sending, by the first serial port by using the switching circuit and the signal interface, first data to a first serial port device that is outside the apparatus and corresponding to the first serial port includes:

sending, by the first serial port by using the switching circuit, the first data to the signal transmitting interface, so that the signal transmitting interface sends the received first data to the first serial port device;

the receiving, by the second serial port by using the signal interface, second data sent by the second serial port device that is outside the apparatus and corresponding to the second serial port includes:

receiving, by the second serial port by using the signal receiving interface, the second data sent by the second serial port device; and the sending, by the second serial port by using the switching circuit and the signal interface, the third data to the second serial port device includes:

sending, by the second serial port by using the switching circuit, the third data to the signal transmitting interface, so that the signal transmitting interface sends the received third data to the second serial port device.

With reference to the first possible implementation manner of the second aspect, in a second possible implementation manner, the method further includes:

receiving, by the first serial port by using the signal receiving interface of the signal interface, fourth data sent by the first serial port device.

With reference to the second aspect, or the first or the second possible implementation manner of the second aspect, in a third possible implementation manner, the second data is a specific character used to indicate whether the second serial port device needs to receive the third data sent by the second serial port.

In the method and the apparatus for using a serial port device in a time division multiplexing manner provided in the embodiments of the present invention, a switching circuit is introduced between two serial ports and a signal interface, where the two serial ports are a first serial port and a second serial port, and the switching circuit is configured to select to receive data sent by one serial port from the first serial port and the second serial port and output the data to the signal interface. Therefore, when the first serial port communicates with a corresponding first serial port device by using the switching circuit and the signal interface, if the second serial port detects that a second serial port device corresponding to the second serial port needs to receive data sent by the second serial port, the second serial port instructs the switching circuit to select to receive the data sent by the second serial port, so as to implement communication between the second serial port and the corresponding second serial port device. Therefore, the first serial port and the second serial port can use corresponding serial port devices in a time division multiplexing manner, thereby ensuring that there is no communication conflict in an entire communication process.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

An apparatus for using a serial port device in a time division multiplexing manner described in the embodiments of the present invention may be a chip, and the chip may specifically be an application-specific integrated circuit (ASIC), a field programmable gate array (FPGA), or a complex programmable logical device (CPLD). No limitation is constituted on a specific form of the chip in the embodiments of the present invention, and the specific form of the foregoing chip is merely used as an example and is not an exhaustion.

Figure 1:
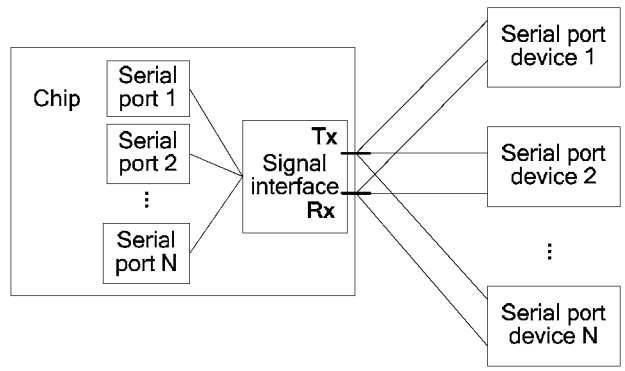
FIG. 1 is a structural diagram of communication between multiple serial ports inside a chip and corresponding serial port devices in the prior art.
Figure 2:
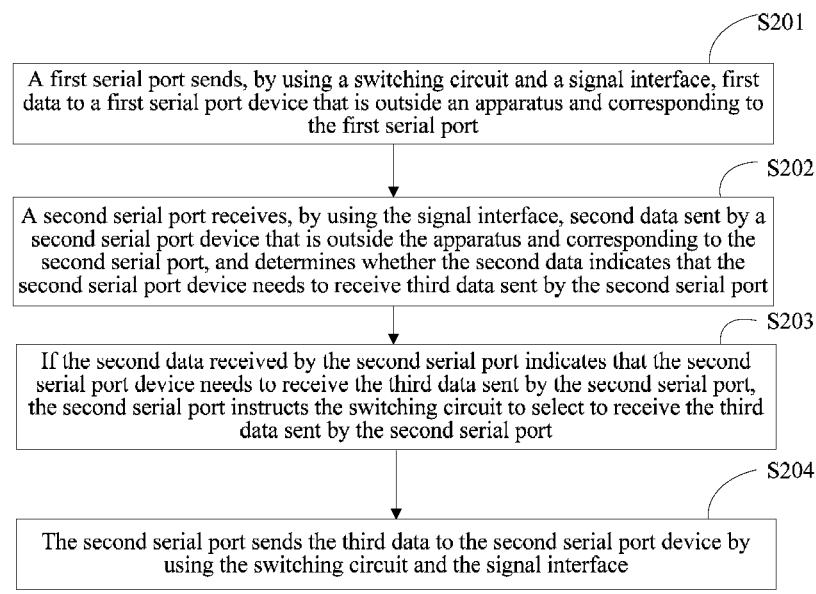
FIG. 2 is a schematic diagram of a method for using a serial port device in a time division multiplexing manner according to an embodiment of the present invention.

FIG. 2 describes a method for using a serial port device in a time division multiplexing manner provided in an embodiment of the present invention, and the method is applied to an apparatus for using a serial port device in a time division multiplexing manner. The apparatus includes a first serial port, a second serial port, a switching circuit, and a signal interface. The method for using a serial port device in a time division multiplexing manner includes:

S201. The first serial port sends, by using the switching circuit and the signal interface, first data to a first serial port device that is outside the apparatus and corresponding to the first serial port.

The switching circuit is located between two serial ports and the signal interface, where the serial ports are the first serial port and the second serial port, and configured to select data sent by one serial port from the two serial ports and output the data to the signal interface. Obviously, there may be multiple serial ports in the apparatus. If there are multiple serial ports in the apparatus, the switching circuit is configured to select input data of one serial port from the multiple serial ports and output the data to the signal interface. Specifically, the switching circuit may be a multiplexer (MUX); and the signal interface includes a signal transmitting interface and a signal receiving interface.

Specifically, that the first serial port sends, by using the switching circuit and the signal interface, first data to a first serial port device that is outside the apparatus and corresponding to the first serial port includes the following:

The first serial port sends, by using the switching circuit, the first data to the signal transmitting interface of the signal interface, and the signal transmitting interface sends the received first data to the first serial port device.

Further, the first serial port further receives, by using the signal receiving interface of the signal interface, fourth data sent by the first serial port device. It should be noted that using the switching circuit is not required when the first serial port receives the fourth data by using the signal receiving interface.

S202. The second serial port receives, by using the signal interface, second data sent by a second serial port device that is outside the apparatus and corresponding to the second serial port, and determines whether the second data indicates that the second serial port device needs to receive third data sent by the second serial port.

Specifically, in a process of communication between the first serial port and the first serial port device, that is, in a process in which the first serial port sends the first data to the first serial port device by using the switching circuit and the signal interface, and the first serial port receives, by using the signal interface, the fourth data sent by the first serial port device, the second serial port receives, by using the signal receiving interface of the signal interface, the second data sent by the second serial port device corresponding to the second serial port, and determines whether the second data indicates that the second serial port device needs to receive the third data sent by the second serial port. It should be noted that using the switching circuit is not required when the second serial port directly receives the second data by using the signal receiving interface.

The second data may be a specific character used to indicate whether the second serial port device needs to receive the third data sent by the second serial port, and the specific character may be a character that satisfies a specific regularity, or a specified character. Therefore, when the second serial port device needs to receive the third data sent by the second serial port, the second serial port device sends the specific character to the second serial port, and after receiving the specific character, the second serial port determines that the second serial port device needs to receive the third data sent by the second serial port.

S203. If the second data received by the second serial port indicates that the second serial port device needs to receive the third data sent by the second serial port, the second serial port instructs the switching circuit to select to receive the third data sent by the second serial port.

It should be noted that, if the second data received by the second serial port indicates that the second serial port device needs to receive the third data sent by the second serial port, the second serial port may send a notification message to the first serial port so as to instruct the first serial port to stop sending data. No limitation is constituted in the present invention on whether the second serial port instructs the first serial port to stop sending data, when the switching circuit selects to receive the third data sent by the second serial port, it indicates that the switching circuit stops receiving the first data sent by the first serial port, that is, the first serial port cannot send the first data to the first serial port device.

S204. The second serial port sends the third data to the second serial port device by using the switching circuit and the signal interface.

Specifically, the second serial port sends the third data to the signal transmitting interface of the signal interface by using the switching circuit, and the signal transmitting interface sends the received third data to the second serial port device; and the second serial port receives, by using the signal receiving interface of the signal interface, data sent by the second serial port device.

In the method for using a serial port device in a time division multiplexing manner provided in this embodiment, a switching circuit is introduced between two serial ports and a signal interface, where the serial ports are a first serial port and a second serial port, and the switching circuit is configured to select to receive data sent by one serial port from the first serial port and the second serial port and output the data to the signal interface. Therefore, when the first serial port communicates with a corresponding first serial port device by using the switching circuit and the signal interface, if the second serial port detects that a second serial port device corresponding to the second serial port needs to receive data sent by the second serial port, the second serial port instructs the switching circuit to select to receive the data sent by the second serial port, so as to implement communication between the second serial port and the corresponding second serial port device. Therefore, the first serial port and the second serial port can use corresponding serial port devices in a time division multiplexing manner, thereby ensuring that there is no communication conflict in an entire communication process.

Figure 3:
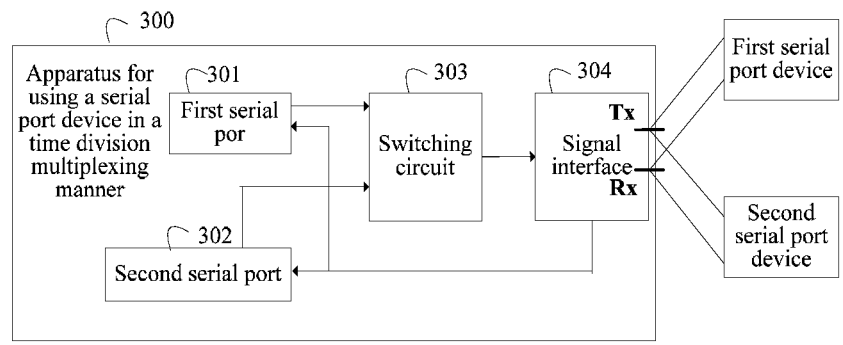
FIG. 3 is a schematic structural diagram of an apparatus for using a serial port device in a time division multiplexing manner according to an embodiment of the present invention.

FIG. 3 is an apparatus 300 for using a serial port device in a time division multiplexing manner provided in an embodiment of the present invention, and the apparatus 300 includes: a first serial port 301, a second serial port 302, a switching circuit 303, and a signal interface 304.

The switching circuit 303 is configured to select to receive data sent by one serial port from the first serial port 301 and the second serial port 302, and output the data to the signal interface 304;

the signal interface 304 is coupled to a first serial port device and a second serial port device outside the apparatus 300; and specifically, the signal interface 304 is an interface for a serial port inside the apparatus 300 to communicate with a serial port device outside the apparatus 300, and the signal interface 304 includes a Tx interface and an Rx interface, where the Tx is a signal transmitting interface, and the Rx is a signal receiving interface.

The first serial port 301 is coupled to the signal interface 304 by using the switching circuit 303 and configured to, when the switching circuit 303 selects to receive first data sent by the first serial port 301, send the first data to the first serial port device corresponding to the first serial port 301 by using the switching circuit 303 and the signal interface 304; and specifically, the first serial port 301 is coupled to the signal transmitting interface Tx of the signal interface 304 by using the switching circuit 303, the first serial port 301 sends the first data to the signal transmitting interface Tx by using the switching circuit 303, and the signal transmitting interface Tx sends the received first data to the first serial port device.

The first serial port 301 is further configured to receive, by using the signal interface 304, fourth data sent by the first serial port device; and specifically, the first serial port 301 receives, by using the signal receiving interface Rx of the signal interface 304, the fourth data sent by the first serial port device.

The second serial port 302 is configured to receive, by using the signal interface 304, second data sent by the second serial port device corresponding to the second serial port 302, and determine whether the second data indicates that the second serial port device needs to receive third data sent by the second serial port 302; and if the second data received by the second serial port 302 indicates that the second serial port device needs to receive the third data sent by the second serial port 302, instruct the switching circuit 303 to select to receive the third data sent by the second serial port 302; and specifically, in a process of communication between the first serial port and the first serial port device, that is, in a process in which the first serial port 301 sends the first data to the first serial port device by using the switching circuit 303 and the signal interface 304, and the first serial port 301 receives, by using the signal interface 304, the fourth data sent by the first serial port device, the second serial port 302 receives, by using the signal receiving interface Rx of the signal interface 304, the second data sent by the second serial port device, and determines whether the second data indicates that the second serial port device needs to receive the third data sent by the second serial port 302. It should be noted that using the switching circuit is not required when the second serial port 302 directly receives the second data by using the signal receiving interface Rx.

The second data may be a specific character used to indicate whether the second serial port device needs to receive the third data sent by the second serial port 302, and the specific character may be a character that satisfies a specific regularity, or a specified character. Therefore, when the second serial port device needs to receive the third data sent by the second serial port 302, the second serial port device sends the specific character to the second serial port 302, and after receiving the specific character, the second serial port 302 determines that the second serial port device needs to receive the third data sent by the second serial port 302.

The second serial port 302 is coupled to the signal interface 304 by using the switching circuit 303 and further configured to, when the switching circuit 303 selects to receive the third data sent by the second serial port 302, send the third data to the second serial port device by using the switching circuit 303 and the signal interface 304; and specifically, the second serial port 302 sends the third data to the signal transmitting interface Tx of the signal interface 304 by using the switching circuit 303, and the signal transmitting interface Tx sends the received third data to the second serial port device.

Figure 4:
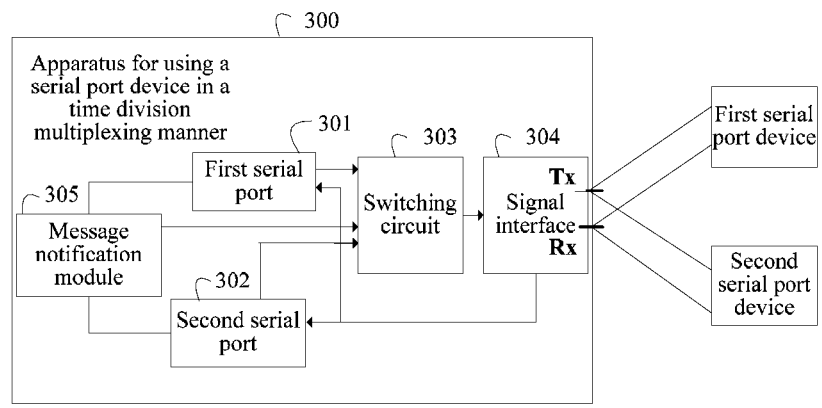
FIG. 4 is a schematic structural diagram of an apparatus for using a serial port device in a time division multiplexing manner according to another embodiment of the present invention.

In another embodiment of the present invention, the apparatus 300 for using a serial port device in a time division multiplexing manner further includes a message notification module 305. FIG. 4 shows a structural diagram of the apparatus 300 for using a serial port device in a time division multiplexing manner, which includes the message notification module 305.

The message notification module 305 is configured to receive an indication sent by a serial port (such as the first serial port and the second serial port) inside the apparatus 300, and instruct, according to the indication, the switching circuit 303 to select to receive data sent by one serial port from the first serial port and the second serial port.

In this embodiment, the second serial port 302 does not directly instruct the switching circuit 303 to select to receive the third data sent by the second serial port 302, and the second serial port 302 is specifically configured to:

when the received second data sent by the second serial port device indicates that the second serial port device needs to receive the third data sent by the second serial port 302, send an indication, to the message notification module 305, that the second serial port device needs to receive the third data sent by the second serial port 302; and after receiving the indication, sent by the second serial port 302, that the second serial port device needs to receive the third data sent by the second serial port 302, the message notification module 305 is configured to determine, according to a priority of the first serial port and a priority of the second serial port, whether to immediately instruct the switching circuit 303 to select to receive the third data sent by the second serial port 302, where a priority of a serial port is used to indicate a preferred order of performing, by the serial port, communication with a serial port device that is outside the apparatus 300 and corresponding to the serial port.

Specifically, when the priority of the second serial port 302 is higher than the priority of the first serial port 301, the message notification module 305 immediately instructs the switching circuit 303 to select to receive the third data sent by the second serial port; or when the priority of the second serial port 302 is lower than the priority of the first serial port 301, the message notification module 305 waits to receive an indication, sent by the first serial port 301, that the first serial port 301 completes sending the first data to the first serial port device, and after receiving the indication, sent by the first serial port 301, that the first serial port 301 completes sending the first data to the first serial port device, instructs the switching circuit 303 to select to receive the third data sent by the second serial port 302.

It can be learned from the foregoing that, when the priority of the second serial port 302 is higher than the priority of the first serial port 301, the switching circuit 303 stops the first serial port 301 from continuing to send the first data to the first serial port device, and selects to receive the third data sent by the second serial port 302 to the second serial port device. In this case, further, if the second serial port 302 completes sending the third data to the second serial port device, the second serial port 302 is further configured to send an indication, to the message notification module 305, that the second serial port 302 completes sending the third data to the second serial port device; and the message notification module 305 is further configured to, after receiving the indication that the second serial port 302 completes sending the third data to the second serial port device, instruct the switching circuit 303 to select to receive the first data sent by the first serial port 301, so as to restore the first serial port 301 to send the first data to the first serial port device.

In the present invention, the message notification module 305 may specifically be a processor, and the processor is configured to invoke system software running on the apparatus 300, so as to perform the function described above and performed by the message notification module 305; and the message notification module 305 may further be hardware logic that performs the function described above and performed by the message notification module 305. No limitation is constituted on a specific implementation manner of the message notification module 305 in the present invention.

A quantity of serial ports included in the apparatus 300 for using a serial port device in a time division multiplexing manner may be more than two, and the quantity of serial ports included in the apparatus 300 for using a serial port device in a time division multiplexing manner is not limited in the present invention. That three serial ports are included in the apparatus 300 for using a serial port device in a time division multiplexing manner is used as an example in the following embodiment.

Figure 5:
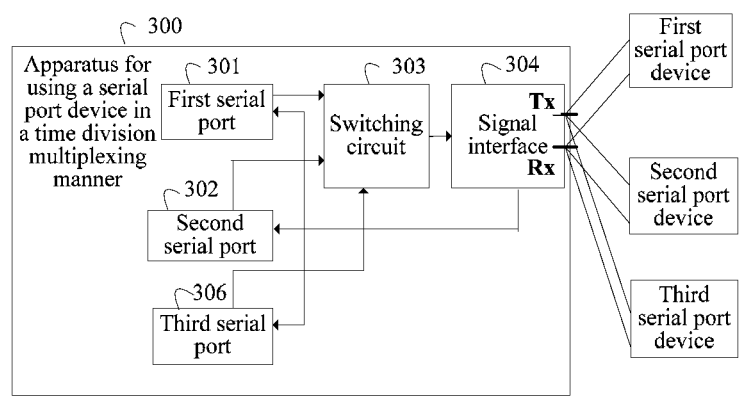
FIG. 5 is a schematic structural diagram of an apparatus for using a serial port device in a time division multiplexing manner according to another embodiment of the present invention.

In another embodiment of the present invention, the apparatus 300 for using a serial port device in a time division multiplexing manner further includes a third serial port 306, and the third serial port 306 can be combined into the embodiment shown in FIG. 3. FIG. 5 shows a structure of the apparatus 300 for using a serial port device in a time division multiplexing manner, when the third serial port 306 is combined into the embodiment shown in FIG. 3.

The switching circuit 303 is further configured to select to receive data sent by one serial port from the first serial port 301, the second serial port 302, and the third serial port 306, and output the data to the signal interface 304.

The third serial port 306 is configured to receive, by using the signal receiving interface Rx of the signal interface 304, fifth data sent by a third serial port device that is outside the apparatus 300 and corresponding to the third serial port 306, and determine whether the fifth data received by the third serial port 306 indicates that the third serial port device needs to receive sixth data sent by the third serial port 306.

The fifth data may be a specific character used to indicate whether the third serial port device needs to receive the sixth data sent by the third serial port 306, and the specific character may be a character that satisfies a specific regularity, or a specified character. Therefore, when the third serial port device needs to receive the sixth data sent by the third serial port 306, the third serial port device sends the specific character to the third serial port 306, and after receiving the specific character, the third serial port 306 determines that the third serial port device needs to receive the sixth data sent by the third serial port 306.

If the fifth data received by the third serial port 306 indicates that the third serial port device needs to receive the sixth data sent by the third serial port 306, the third serial port 306 instructs the switching circuit 303 to select to receive the sixth data sent by the third serial port 306.

When the switching circuit 303 selects to receive the sixth data sent by the third serial port 306, the third serial port 306 sends the sixth data to the third serial port device by using the switching circuit 303 and the signal interface 304.

Figure 6:
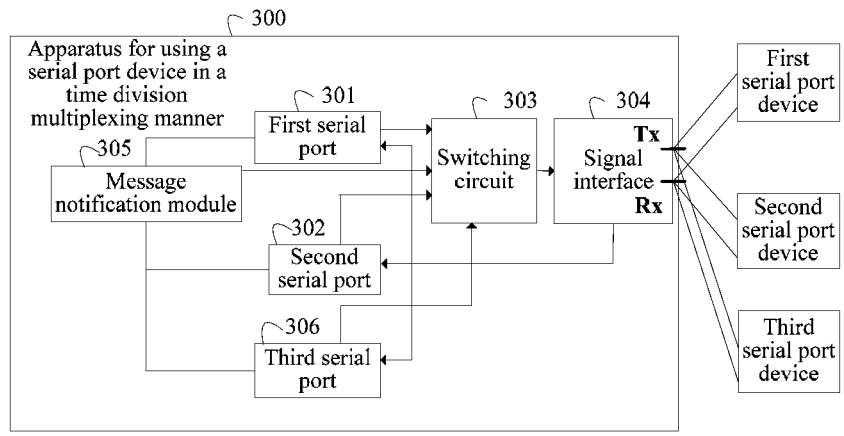
FIG. 6 is a schematic structural diagram of an apparatus for using a serial port device in a time division multiplexing manner according to another embodiment of the present invention.

In another embodiment of the present invention, the apparatus 300 for using a serial port device in a time division multiplexing manner further includes a third serial port 306, and the third serial port 306 can be combined into the embodiment shown in FIG. 4. FIG. 6 shows a structure of the apparatus 300 for using a serial port device in a time division multiplexing manner, when the third serial port 306 is combined into the embodiment shown in FIG. 4.

In this embodiment, the message notification module 305 may further receive an indication sent by the third serial port 306, and instruct, according to the indication, the switching circuit 303 to select to receive sixth data sent by the third serial port 306.

In this embodiment, similar to the second serial port 302, the third serial port 306 does not directly instruct the switching circuit 303 to select the sixth data sent by the third serial port 306, but first instructs the message notification module 305; and the message notification module 305 instructs the switching circuit 303. Specifically, the third serial port 306 is configured to:

when the received fifth data sent by the third serial port device indicates that the third serial port device needs to receive the sixth data sent by the third serial port 306, send an indication, to the message notification module 305, that the third serial port device needs to receive the sixth data sent by the third serial port 306; and after receiving the indication, sent by the third serial port 306, that the third serial port device needs to receive the sixth data sent by the third serial port 306, the message notification module 305 is configured to determine, according to a priority of the third serial port 306 and a priority of a serial port (such as the first serial port or the second serial port) that is sending data to the switching circuit 303, whether to immediately instruct the switching circuit 303 to select to receive the sixth data sent by the third serial port 306.

Specifically, when the priority of the third serial port 306 is higher than the priority of the serial port that is sending data to the switching circuit 303, the message notification module 305 immediately instructs the switching circuit 303 to select to receive the sixth data sent by the third serial port 306; and when the priority of the third serial port 306 is lower than the priority of the serial port that is sending data to the switching circuit 303, the message notification module 305 waits to receive an indication that the serial port that is sending data to the switching circuit 303 completes sending data to a corresponding serial port device, and after receiving the indication that the serial port that is sending data to the switching circuit 303 completes sending data to the corresponding serial port device, instructs the switching circuit 303 to select to receive the sixth data sent by the third serial port 306.

It can be learned from the foregoing that, when the priority of the third serial port 306 is higher than the priority of the serial port that is sending data to the switching circuit 303, the switching circuit stops the serial port that is sending data to the switching circuit 303 from continuing to send data, and selects to receive the sixth data sent by the third serial port 306 to the third serial port device. In this case, further, if the third serial port 306 completes sending the sixth data to the third serial port device, the third serial port 306 is further configured to send an indication, to the message notification module 305, that the third serial port 306 completes sending the sixth data to the third serial port device; and the message notification module 305 is further configured to, after receiving the indication that the third serial port 306 completes sending the sixth data to the third serial port device, instruct the switching circuit 303 to select to receive data sent by the serial port that is previously stopped from sending data, so as to restore the serial port that is previously stopped from sending data to continue to send data to the corresponding serial port device.

In the apparatus for using a serial port device in a time division multiplexing manner provided in this embodiment, a switching circuit is introduced between two serial ports and a signal interface, where the serial ports are a first serial port and a second serial port, and the switching circuit is configured to select to receive data sent by one serial port from the first serial port and the second serial port and output the data to the signal interface. Therefore, when the first serial port communicates with a corresponding first serial port device by using the switching circuit and the signal interface, if the second serial port detects that a second serial port device corresponding to the second serial port needs to receive data sent by the second serial port, the second serial port instructs the switching circuit to select to receive the data sent by the second serial port, so as to implement communication between the second serial port and the corresponding second serial port device. Therefore, the first serial port and the second serial port can use corresponding serial port devices in a time division multiplexing manner, thereby ensuring that there is no communication conflict in an entire communication process.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It should be noted that, a chip is used as an example to describe the method and the apparatus involved in the embodiments. However, in fact, the chip may also be replaced with any apparatus for using a serial port device in a time division multiplexing manner; and the apparatus may be an apparatus constituted by a discrete device, such as a printed circuit board (PCB), and unnecessarily be a chip manufactured by an integrated circuit technology. A production process and method of the apparatus should not be intended to limit the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus for using a serial port device by time division multiplexing, wherein the apparatus comprises:
    a first serial port,
    a second serial port,
    a switching circuit, and
    a signal interface, wherein:
    the switching circuit is configured to select one serial port from the first serial port and the second serial port to receive data sent by the one serial port, and output the data to the signal interface;
    the signal interface is coupled to a first serial port device and a second serial port device outside the apparatus;
    the first serial port is coupled to the signal interface by using the switching circuit and configured to, when the switching circuit selects to receive first data sent by the first serial port, send the first data to the first serial port device corresponding to the first serial port by using the switching circuit and the signal interface;
    the first serial port is further configured to receive fourth data sent by the first serial port device by using the signal interface;
    the second serial port is configured to receive, by using the signal interface, second data sent by the second serial port device corresponding to the second serial port, and determine whether the second data indicates that the second serial port device needs to receive third data sent by the second serial port; and if the second data received by the second serial port indicates that the second serial port device needs to receive the third data sent by the second serial port, instruct the switching circuit to select to receive the third data sent by the second serial port; and
    the second serial port is coupled to the signal interface by using the switching circuit and further configured to, when the switching circuit selects to receive the third data sent by the second serial port, send the third data to the second serial port device by using the switching circuit and the signal interface.

2. The apparatus according to claim 1, wherein the apparatus further comprises a message notification module, and the second serial port is specifically configured to:
    when the second data received by the second serial port indicates that the second serial port device needs to receive the third data sent by the second serial port, send, to the message notification module, an indication that the second serial port device needs to receive the third data sent by the second serial port; and
    after receiving the indication, sent by the second serial port, that the second serial port device needs to receive the third data sent by the second serial port, the message notification module is configured to determine, according to a priority of the first serial port and a priority of the second serial port, whether to immediately instruct the switching circuit to select to receive the third data sent by the second serial port; and
    the message notification module is specifically configured to, when the priority of the second serial port is higher than the priority of the first serial port, immediately instruct the switching circuit to select to receive the third data sent by the second serial port; or
    when the priority of the second serial port is lower than the priority of the first serial port, wait to receive an indication, sent by the first serial port, that the first serial port completes sending the first data to the first serial port device, and after receiving the indication, sent by the first serial port, that the first serial port completes sending the first data to the first serial port device, instruct the switching circuit to select to receive the third data sent by the second serial port.

3. The apparatus according to claim 2, wherein:
    the second serial port is further configured to send, to the message notification module, an indication that the second serial port completes sending the third data to the second serial port device; and
    the message notification module is further configured to, after receiving the indication, sent by the second serial port, that the second serial port completes sending the third data to the second serial port device, instruct the switching circuit to select to receive the first data sent by the first serial port, so as to restore the first serial port to send the first data to the first serial port device.

4. The apparatus according to claim 1, wherein the signal interface comprises a signal transmitting interface and a signal receiving interface, wherein:
    the first serial port and the second serial port are specifically coupled to the signal transmitting interface of the signal interface by using the switching circuit, the first serial port sends the first data to the signal transmitting interface by using the switching circuit, the second serial port sends the third data to the signal transmitting interface by using the switching circuit, and the signal transmitting interface sends the received first data to the first serial port device or sends the received third data to the second serial port device; and
    the signal receiving interface of the signal interface receives the fourth data sent by the first serial port device or the second data sent by the second serial port device, and sends the fourth data to the first serial port or the second data to the second serial port.

5. The apparatus according to claim 1, wherein the apparatus further comprises a third serial port, the switching circuit is specifically configured to the one serial port from the first serial port, the second serial port, and the third serial port to receive data sent by the one serial port, and output the data to the signal interface, and the third serial port is configured to:
  receive, by using the signal interface, fifth data sent by a third serial port device that is outside the apparatus and corresponding to the third serial port, and determine whether the fifth data received by the third serial port indicates that the third serial port device needs to receive sixth data sent by the third serial port;
  if the fifth data received by the third serial port indicates that the third serial port device needs to receive the sixth data sent by the third serial port, instruct the switching circuit to select to receive the sixth data sent by the third serial port; and
  when the switching circuit selects to receive the sixth data sent by the third serial port, send the sixth data to the third serial port device by using the switching circuit and the signal interface.

6. The apparatus according to claim 1, wherein the apparatus is a chip.

7. The apparatus according to claim 1, wherein the second data is a specific character used to indicate whether the second serial port device needs to receive the third data sent by the second serial port.

8. A method for using a serial port device with an apparatus by time division multiplexing, the apparatus comprises a first serial port, a second serial port, a switching circuit, and a signal interface, the switching circuit is configured to select one serial port from the first serial port and the second serial port to receive data sent by the one serial port and output the data to the signal interface, and the method comprises:
  sending, by the first serial port by using the switching circuit and the signal interface, first data to a first serial port device that is outside the apparatus and corresponding to the first serial port;
  receiving, by the second serial port by using the signal interface, second data sent by a second serial port device that is outside the apparatus and corresponding to the second serial port, and determining whether the second data indicates that the second serial port device needs to receive third data sent by the second serial port;
  if the second data received by the second serial port indicates that the second serial port device needs to receive the third data sent by the second serial port, instructing, by the second serial port, the switching circuit to select to receive the third data sent by the second serial port; and
  sending, by the second serial port by using the switching circuit and the signal interface, the third data to the second serial port device.

9. The method according to claim 8, wherein the signal interface comprises a signal transmitting interface and a signal receiving interface, and the sending, by the first serial port by using the switching circuit and the signal interface, the first data to the first serial port device that is outside the apparatus and corresponding to the first serial port comprises:
  sending, by the first serial port using the switching circuit, the first data to the signal transmitting interface, so that the signal transmitting interface sends the received first data to the first serial port device;
  the receiving, by the second serial port by using the signal interface, the second data sent by the second serial port device that is outside the apparatus and corresponding to the second serial port comprises: receiving, by the second serial port by using the signal receiving interface, the second data sent by the second serial port device; and
  the sending, by the second serial port by using the switching circuit and the signal interface, the third data to the second serial port device comprises:
  sending, by the second serial port by using the switching circuit, the third data to the signal transmitting interface, so that the signal transmitting interface sends the received third data to the second serial port device.

10. The method according to claim 9, wherein the method further comprises:
  receiving, by the first serial port by using the signal receiving interface of the signal interface, fourth data sent by the first serial port device.

11. The method according to claim 8, wherein the second data is a specific character used to indicate whether the second serial port device needs to receive the third data sent by the second serial port.

* * * * *